United States Patent
Kumura et al.

(10) Patent No.: US 8,562,851 B2
(45) Date of Patent: Oct. 22, 2013

(54) FERRITE MATERIAL AND ELECTRONIC COMPONENT

(75) Inventors: Yui Kumura, Saku (JP); Yukio Isowaki, Saku (JP); Tadashi Otagiri, Nagoya (JP)

(73) Assignees: Soshin Electric Co., Ltd., Saku (JP); NGK Insulators, Ltd., Nagoya (JP)

( * ) Notice: Subject to any disclaimer, the term of this patent is extended or adjusted under 35 U.S.C. 154(b) by 216 days.

(21) Appl. No.: 13/257,766

(22) PCT Filed: Mar. 25, 2010

(86) PCT No.: PCT/JP2010/055280
§ 371 (c)(1),
(2), (4) Date: Sep. 20, 2011

(87) PCT Pub. No.: WO2010/113772
PCT Pub. Date: Oct. 7, 2010

(65) Prior Publication Data
US 2012/0007015 A1     Jan. 12, 2012

(30) Foreign Application Priority Data

Mar. 30, 2009 (JP) ................................ 2009-082211

(51) Int. Cl.
*H01F 1/34*     (2006.01)
*H01F 17/04*     (2006.01)

(52) U.S. Cl.
USPC .................... 252/62.6; 252/62.63; 252/62.62; 252/62.59

(58) Field of Classification Search
USPC ......... 501/126; 252/62.62, 62.63, 62.59, 62.6
See application file for complete search history.

(56) References Cited

FOREIGN PATENT DOCUMENTS

| JP | 8-151258 | 6/1996 |
| JP | 2006-151742 | 6/2006 |

*Primary Examiner* — Carol M Koslow
(74) *Attorney, Agent, or Firm* — Burr & Brown

(57) ABSTRACT

A ferrite material and an electronic component which employs sintered ferrite formed from the ferrite material. The ferrite material is obtained by adding, as minor ingredients, 0.06-0.50 parts by weight of bismuth oxide in terms of $Bi_2O_3$, 0.11-0.90 parts by weight of titanium oxide in terms of $TiO_2$, and 0.06-0.46 parts by weight of barium oxide in terms of BaO to a ferrite powder comprising iron oxide, copper oxide, zinc oxide, and nickel oxide as major ingredients. The weight ratio among the bismuth oxide, the titanium oxide, and the barium oxide is as follows: when the proportion of the bismuth oxide in terms of $Bi_2O_3$ is taken as 1.00, then the proportion of the titanium oxide in terms of $TiO_2$ is 1.08-2.72 and that of the barium oxide in terms of BaO is 0.72-1.20.

3 Claims, No Drawings

FERRITE MATERIAL AND ELECTRONIC COMPONENT

TECHNICAL FIELD

The present invention relates to a ferrite material and an electronic component, suitable, for example, for use in a coil component containing a ferrite material as a core.

BACKGROUND ART

In a coil component such as a multilayer inductor using a ferrite material as a core, the inductance value is reduced depending on a direct current applied. Therefore, in an electronic component utilizing a superimposed direct current, the rated current depends mainly on the inductance reduction. Thus, in view of increasing the rated current, the ferrite material (a sintered ferrite body) used in the core of the coil component is required to have an excellent DC superposition characteristic.

In conventional technologies, for example, as described in Japanese Laid-Open Patent Publication No. 2006-151742, bismuth oxide and titanium oxide are added to an NiCuZn-based ferrite material to improve the DC superposition characteristic.

SUMMARY OF THE INVENTION

Meanwhile, the DC superposition characteristic (the magnetic field strength obtained when the initial magnetic permeability is reduced by 10%) is approximately inversely proportional to the initial magnetic permeability. Therefore, the product of the DC superposition characteristic and the initial magnetic permeability is approximately constant. Thus, when the DC superposition coefficient is defined as the product value of the DC superposition characteristic×the initial magnetic permeability, a material having a larger DC superposition coefficient is more excellent in the DC superposition characteristic. In Japanese Laid-Open Patent Publication No. 2006-151742, the DC superposition characteristic is the current value obtained when the initial magnetic permeability is reduced by 10%. When the current value is converted to the magnetic field strength obtained when the initial magnetic permeability is reduced by 10%, only two examples of the publication exhibit values of more than 30000, most of examples of the publication exhibit values of about 28000, and the publication describes only slight improvement in the DC superposition characteristic. Furthermore, even the examples with the values of more than 30000 exhibit a low specific resistance ($\Omega \cdot m$) of $1 \times 10^6$ order, a low Q value, and a large loss, disadvantageously.

In view of the above problems, an object of the present invention is to provide a ferrite material exhibiting satisfactory DC superposition characteristic, high specific resistance, and less magnetic property deterioration.

Another object of the present invention is to provide an electronic component that contains a sintered ferrite body exhibiting satisfactory DC superposition characteristic, high specific resistance, and less magnetic property deterioration, and thereby enables stable circuit operation at a high rated current.

A ferrite material according to a first aspect of the present invention is obtained by adding 0.06 to 0.50 parts by weight of bismuth oxide in terms of $Bi_2O_3$, 0.11 to 0.90 parts by weight of titanium oxide in terms of $TiO_2$, and 0.06 to 0.46 parts by weight of barium oxide in terms of BaO as minor components to a ferrite powder containing iron oxide, copper oxide, zinc oxide, and nickel oxide as major components.

As a result, the ferrite material can have the satisfactory DC superposition characteristic and high specific resistance, and can prevent the magnetic property deterioration.

In the first aspect, the weight ratios of the bismuth oxide, the titanium oxide, and the barium oxide are such that when the proportion of the bismuth oxide is 1.00 in terms of $Bi_2O_3$, the proportion of the titanium oxide is 1.08 to 2.72 in terms of $TiO_2$ and the proportion of the barium oxide is 0.72 to 1.20 in terms of BaO.

As a result, the ferrite material can have a DC superposition coefficient of 46000 or more and a specific resistance ($\Omega \cdot cm$) of $1 \times 10^9$ order or more. The DC superposition coefficient is obtained from the DC superposition characteristic (the magnetic field strength obtained when the initial magnetic permeability is reduced by 10%)×the initial magnetic permeability.

In the first aspect, the major components contain 46.0 to 49.5 mol % of the iron oxide in terms of $Fe_2O_3$, 5.0 to 15.0 mol % of the copper oxide in terms of CuO, 3.0 to 30.0 mol % of the zinc oxide in terms of ZnO, and the remaining mol % of the nickel oxide in terms of NiO. In this case, it is preferred that the major components contain 47.0 to 49.0 mol % of the iron oxide in terms of $Fe_2O_3$, 10.0 to 15.0 mol % of the copper oxide in terms of CuO, 17.0 to 30.0 mol % of the zinc oxide in terms of ZnO, and the remaining mol % of the nickel oxide in terms of NiO.

As a result, the major components can achieve practicable magnetic properties, i.e. a DC superposition coefficient of 30000 or more and a specific resistance of $1 \times 10^7$ ($\Omega \cdot cm$) or more. Furthermore, optimum amounts of the above minor components added can achieve a DC superposition coefficient of 46000 or more and a specific resistance ($\Omega \cdot cm$) of $1 \times 10^9$ order or more.

An electronic component according to a second aspect of the present invention comprises a sintered ferrite body, which is obtained by adding 0.06 to 0.50 parts by weight of bismuth oxide in terms of $Bi_2O_3$, 0.11 to 0.90 parts by weight of titanium oxide in terms of $TiO_2$, and 0.06 to 0.46 parts by weight of barium oxide in terms of BaO as minor components to a ferrite powder containing iron oxide, copper oxide, zinc oxide, and nickel oxide as major components, and by mixing and sintering the components. The major components contain 46.0 to 49.5 mol % of the iron oxide in terms of $Fe_2O_3$, 5.0 to 15.0 mol % of the copper oxide in terms of CuO, 3.0 to 30.0 mol % of the zinc oxide in terms of ZnO, and the remaining mol % of the nickel oxide in terms of NiO. Furthermore, the weight ratios of the bismuth oxide, the titanium oxide, and the barium oxide are such that using the proportion of the bismuth oxide as 1.00 in terms of $Bi_2O_3$, the proportion of the titanium oxide is 1.08 to 2.72 in terms of $TiO_2$ and the proportion of the barium oxide is 0.72 to 1.20 in terms of BaO.

Since the sintered ferrite body contains the ferrite material exhibiting the satisfactory DC superposition characteristic, high specific resistance, and less magnetic property deterioration, the electronic component is capable of stable circuit operation at a high rated current.

As described above, the ferrite material of the present invention can have the satisfactory DC superposition characteristic and high specific resistance, and can prevent the magnetic property deterioration.

In addition, the electronic component of the present invention is capable of stable circuit operation at a high rated current by use of the sintered ferrite body exhibiting the satisfactory DC superposition characteristic, high specific resistance, and less magnetic property deterioration.

MODE FOR CARRYING OUT THE INVENTION

An embodiment of the ferrite material and the electronic component of the present invention will be described below. It should be noted that, in this description, a numeric range of "A to B" includes both the numeric values A and B as the lower limit and upper limit values.

A ferrite material according to this embodiment is an NiCuZn-based ferrite material, and the major components thereof contain 46.0 to 49.5 mol % of iron oxide in terms of $Fe_2O_3$, 5.0 to 15.0 mol % of copper oxide in terms of CuO, 3.0 to 30.0 mol % of zinc oxide in terms of ZnO, and the remaining mol % of nickel oxide in terms of NiO.

It is preferred that the major components contain 47.0 to 49.0 mol % of the iron oxide in terms of $Fe_2O_3$, 10.0 to 15.0 mol % of the copper oxide in terms of CuO, 17.0 to 30.0 mol % of the zinc oxide in terms of ZnO, and the remaining mol % of the nickel oxide in terms of NiO.

In the above composition of the major components, when the $Fe_2O_3$ content is less than 46.0 mol %, the DC superposition coefficient (the magnetic field strength obtained when the initial magnetic permeability is reduced by 10%×the initial magnetic permeability) and the specific resistance are reduced disadvantageously. On the other hand, when the $Fe_2O_3$ content is more than 49.5 mol %, the initial magnetic permeability is significantly reduced, and the specific resistance is reduced, disadvantageously.

In the above composition of the major components, when the CuO content is less than 5.0 mol %, the initial magnetic permeability is significantly reduced, and the specific resistance is reduced, disadvantageously. On the other hand, when the CuO content is more than 15.0 mol %, the specific resistance is reduced disadvantageously.

In the above composition of the major components, when the ZnO content is less than 3.0 mol %, the initial magnetic permeability is significantly reduced, and the DC superposition coefficient and the specific resistance are reduced, disadvantageously. On the other hand, when the ZnO content is more than 30.0 mol %, the DC superposition characteristic is significantly reduced disadvantageously.

In the ferrite material of this embodiment, 0.06 to 0.5 parts by weight of bismuth oxide in terms of $Bi_2O_3$, 0.11 to 0.9 parts by weight of titanium oxide in terms of $TiO_2$, and 0.06 to 0.46 parts by weight of barium oxide in terms of BaO are added as minor components to the major components.

Thus, the ferrite material can have a satisfactory DC superposition characteristic and a high specific resistance, and can prevent magnetic property deterioration.

Furthermore, in this embodiment, the weight ratios of the bismuth oxide, titanium oxide, and barium oxide is such that using the proportion of the bismuth oxide as 1.00 in terms of $Bi_2O_3$, that of the titanium oxide is 1.08 to 2.72 in terms of $TiO_2$ and that of the barium oxide is 0.72 to 1.20 in terms of BaO.

Thus, the ferrite material can have a DC superposition coefficient of 46000 or more and a specific resistance (Ω·cm) of $1\times10^9$ order or more.

For example, the ferrite material of this embodiment is formed into a core member having a predetermined shape, which is then burned to obtain a sintered ferrite core. Specifically, the core may be prepared by the following process.

First, raw material powders of the major components and the minor components (additives) are measured out respectively. The raw material powders of the major components are wet-blended for about 5 hours using a ball mill or the like to obtain a mixed magnetic material powder. The mixed powder is calcined to obtain a calcined body. The calcination is carried out in an oxidizing atmosphere such as air. The calcination is preferably carried out at a calcination temperature of 500° C. to 900° C. for a calcination time of 1 to 6 hours.

Next, the resulting calcined body is crushed to a predetermined size by using a ball mill or the like to obtain a ceramic powder.

The raw material powders of the minor components are added to the ceramic powder, and the mixture is pulverized for about 20 hours by using a pot mill to obtain a pulverized powder. The minor components may be added by a method containing adding the raw material powders respectively or by a method containing mixing the raw material powders preliminarily, calcining the mixed powder, and adding the calcined powder. For example, an appropriate amount of a polyvinyl alcohol solution is added to and mixed with the obtained pulverized powder to produce a granulated powder. The resulting granulated powder is formed into a desired shape, whereby a compact is prepared.

Then, the compact is burned to produce the sintered ferrite body having a predetermined shape (hereinafter referred to as the ferrite core). The burning is carried out in air at a burning temperature of about 800° C. to 1100° C. for a burning time of about 1 to 5 hours.

Furthermore, a predetermined coil is wound on thus produced ferrite core having the predetermined shape, and the resultant is subjected to resin molding (resin coating) and then used in a fixed inductor, a chip inductor, etc. Such a product can be used as an electronic component in mobile phones, various electronic devices, etc. The shape of the ferrite core is not particularly limited, and may be, for example, a drum shape having an outer diameter and a length of 2 mm or less. For example, the chip inductor contains a ferrite core formed in a cylindrical shape having a large-diameter flange in each end, a coil wound on a body of the core, and a terminal electrode for connecting an end of the coil to an external circuit, the outer surfaces of the members being covered with a mold resin.

For example, the resin used as the mold material (the coating material) may be a thermoplastic or thermosetting resin. More specific examples of the resins include polyolefins, polyesters, polyamides, polycarbonates, polyurethanes, phenol resins, urea resins, and epoxy resins. Specifically, the mold material may be applied by dipping, coating, spraying, or the like, or alternatively by injection, casting, or the like.

The ferrite material of this embodiment may be used as a core material in a multilayer electronic component, i.e. a multilayer inductor or a multilayer LC composite component. Such a multilayer electronic component is obtained by stacking a preliminary processed magnetic or dielectric sheet on the core material and by burning the stack.

The multilayer inductor may be produced by the steps of preparing a plurality of ferrite composition sheets having an inner conductor for forming a coil portion, stacking the sheets, and burning the stack. The burned stack may be processed to form the coil portion (for example, by electrically connecting the sheets in series via through-holes) if necessary.

The ferrite material of this embodiment can have a satisfactory DC superposition characteristic and a high specific resistance, and can prevent the magnetic property deterioration. Since the ferrite material can have such excellent characteristics, the electronic component containing the ferrite core composed of the ferrite material is capable of stable circuit operation at a high rated current.

Example 1

First Example

In samples 1 to 37, the composition ratios of the minor components were variously changed at fixed composition ratios of the major components. The initial magnetic permeability, the DC superposition characteristic (the magnetic field strength (A/m) obtained when the initial magnetic permeability was reduced by 10%), the DC superposition coefficient (the DC superposition characteristic×the initial magnetic permeability), and the specific resistance (Ω·cm) of each sample were measured. The composition ratios of the major components, the composition ratios of the minor components, and the measurement results are shown in Tables 1 to 6. The composition ratios of the major and minor components of the samples 1 to 37 are shown in Tables 1 to 3, and the initial magnetic permeabilities, the DC superposition characteristics, the DC superposition coefficients, and the specific resistances of the samples 1 to 37 are shown in Tables 4 to 6.

TABLE 1

| Sample No. | Major components (mol %) | | | | Minor components (parts by weight) (Weight ratio) | | |
|---|---|---|---|---|---|---|---|
| | $Fe_2O_3$ | NiO | CuO | ZnO | $Bi_2O_3$ | $TiO_2$ | BaO |
| 1 (Comparative) | 48.0 | 20.8 | 11.8 | 19.5 | 0 | 0 | 0 |
| 2 (Comparative) | 48.0 | 20.8 | 11.8 | 19.5 | 0.25 | 0 | 0 |
| 3 (Comparative) | 48.0 | 20.8 | 11.8 | 19.5 | 0.50 | 0 | 0 |
| 4 (Comparative) | 48.0 | 20.8 | 11.8 | 19.5 | 0.25 | 0 | 0.17 |
| 5 (Comparative) | 48.0 | 20.8 | 11.8 | 19.5 | 0.25 | 0.45 | 0 |
| 6 (Comparative) | 48.0 | 20.8 | 11.8 | 19.5 | 0.25 | 1.00 | 0 |
| 7 (Comparative) | 48.0 | 20.8 | 11.8 | 19.5 | 0 | 0.45 | 0.23 |
| 8 (Comparative) | 48.0 | 20.8 | 11.8 | 19.5 | 0.03 (1:15:7.67) | 0.45 | 0.23 |
| 9 (Comparative) | 48.0 | 20.8 | 11.8 | 19.5 | 0.13 (1:3.46:1.77) | 0.45 | 0.23 |
| 10 | 48.0 | 20.8 | 11.8 | 19.5 | 0.19 (1:2.37:1.21) | 0.45 | 0.23 |
| 11 | 48.0 | 20.8 | 11.8 | 19.5 | 0.22 (1:2.04:1.04) | 0.45 | 0.23 |
| 12 | 48.0 | 20.8 | 11.8 | 19.5 | 0.25 (1:1.8:0.92) | 0.45 | 0.23 |

TABLE 2

| Sample No. | Major components (mol %) | | | | Minor components (parts by weight) (Weight ratio) | | |
|---|---|---|---|---|---|---|---|
| | $Fe_2O_3$ | NiO | CuO | ZnO | $Bi_2O_3$ | $TiO_2$ | BaO |
| 13 | 48.0 | 20.8 | 11.8 | 19.5 | 0.28 (1:1.61:0.82) | 0.45 | 0.23 |
| 14 | 48.0 | 20.8 | 11.8 | 19.5 | 0.31 (1:1.45:0.74) | 0.45 | 0.23 |
| 15 (Comparative) | 48.0 | 20.8 | 11.8 | 19.5 | 0.37 (1:1.21:0.62) | 0.45 | 0.23 |
| 16 (Comparative) | 48.0 | 20.8 | 11.8 | 19.5 | 0.05 (1:0.9:0.46) | 0.45 | 0.23 |
| 17 (Comparative) | 48.0 | 20.8 | 11.8 | 19.5 | 1.00 (1:0.45:0.23) | 0.45 | 0.23 |
| 18 (Comparative) | 48.0 | 20.8 | 11.8 | 19.5 | 0.25 (1:0.2:0.72) | 0.05 | 0.18 |
| 19 (Comparative) | 48.0 | 20.8 | 11.8 | 19.5 | 0.25 (1:0.8:0.72) | 0.20 | 0.18 |
| 20 | 48.0 | 20.8 | 11.8 | 19.5 | 0.25 (1:1.08:0.72) | 0.27 | 0.18 |
| 21 | 48.0 | 20.8 | 11.8 | 19.5 | 0.25 (1:2.72:0.72) | 0.68 | 0.18 |
| 22 (Comparative) | 48.0 | 20.8 | 11.8 | 19.5 | 0.25 (1:3.2:0.72) | 0.80 | 0.18 |
| 23 (Comparative) | 48.0 | 20.8 | 11.8 | 19.5 | 0.25 (1:4.4:0.72) | 1.10 | 0.18 |
| 24 (Comparative) | 48.0 | 20.8 | 11.8 | 19.5 | 0.25 (1:1.8:0.12) | 0.45 | 0.03 |
| 25 (Comparative) | 48.0 | 20.8 | 11.8 | 19.5 | 0.25 (1:1.8:0.68) | 0.45 | 0.17 |

TABLE 3

| Sample No. | Major components (mol %) | | | | Minor components (parts by weight) (Weight ratio) | | |
|---|---|---|---|---|---|---|---|
| | $Fe_2O_3$ | NiO | CuO | ZnO | $Bi_2O_3$ | $TiO_2$ | BaO |
| 26 | 48.0 | 20.8 | 11.8 | 19.5 | 0.25 (1:1.8:0.8) | 0.45 | 0.20 |
| 27 | 48.0 | 20.8 | 11.8 | 19.5 | 0.25 (1:1.8:1.2) | 0.45 | 0.30 |
| 28 (Comparative) | 48.0 | 20.8 | 11.8 | 19.5 | 0.25 (1:1.8:1.6) | 0.45 | 0.40 |
| 29 | 48.0 | 20.8 | 11.8 | 19.5 | 0.06 (1:1.83:1) | 0.11 | 0.06 |
| 30 | 48.0 | 20.8 | 11.8 | 19.5 | 0.13 (1:1.77:0.92) | 0.23 | 0.12 |
| 31 | 48.0 | 20.8 | 11.8 | 19.5 | 0.18 (1:1.78:0.94) | 0.32 | 0.17 |
| 32 (Comparative) | 48.0 | 20.8 | 11.8 | 19.5 | 0 | 0.56 | 0.29 |
| 33 | 48.0 | 20.8 | 11.8 | 19.5 | 0.31 (1:1.81:0.94) | 0.56 | 0.29 |
| 34 (Comparative) | 48.0 | 20.8 | 11.8 | 19.5 | 0.50 (1:1.12:0.58) | 0.56 | 0.29 |
| 35 (Comparative) | 48.0 | 20.8 | 11.8 | 19.5 | 0 | 0.90 | 0.46 |
| 36 (Comparative) | 48.0 | 20.8 | 11.8 | 19.5 | 0.25 (1:3.6:1.84) | 0.90 | 0.46 |
| 37 | 48.0 | 20.8 | 11.8 | 19.5 | 0.50 (1:1.8:0.92) | 0.90 | 0.46 |

TABLE 4

| Sample No. | μi | DC superposition characteristic (A/m) | DC superposition coefficient | Specific resistance (Ω·cm) |
|---|---|---|---|---|
| 1 (Comparative) | 173 | 248 | 42904 | 1.5E+08 |
| 2 (Comparative) | 113 | 388 | 43849 | 4.9E+09 |
| 3 (Comparative) | 200 | 120 | 23944 | 1.5E+10 |
| 4 (Comparative) | 151 | 288 | 43576 | 4.8E+09 |
| 5 (Comparative) | 117 | 393 | 45981 | 4.0E+09 |
| 6 (Comparative) | 126 | 353 | 44433 | 1.5E+09 |
| 7 (Comparative) | 83 | 522 | 43269 | 4.4E+10 |

TABLE 4-continued

| Sample No. | μi | DC superposition characteristic (A/m) | DC superposition coefficient | Specific resistance (Ω·cm) |
|---|---|---|---|---|
| 8 (Comparative) | 89 | 488 | 43485 | 1.3E+08 |
| 9 (Comparative) | 93 | 467 | 43571 | 2.5E+11 |
| 10 (Comparative) | 148 | 302 | 44729 | 2.8E+11 |
| 11 | 148 | 312 | 46200 | 2.5E+11 |
| 12 | 147 | 323 | 47601 | 2.2E+11 |

TABLE 5

| Sample No. | μi | DC superposition characteristic (A/m) | DC superposition coefficient | Specific resistance (Ω·cm) |
|---|---|---|---|---|
| 13 | 145 | 324 | 46985 | 2.3E+11 |
| 14 | 141 | 326 | 46034 | 2.2E+11 |
| 15 (Comparative) | 134 | 327 | 43687 | 1.8E+11 |
| 16 (Comparative) | 218 | 120 | 26154 | 2.8E+10 |
| 17 (Comparative) | 239 | 176 | 42043 | 5.2E+09 |
| 18 (Comparative) | 160 | 268 | 42769 | 5.8E+09 |
| 19 (Comparative) | 159 | 288 | 45820 | 7.8E+09 |
| 20 | 152 | 308 | 46800 | 3.5E+10 |
| 21 | 150 | 315 | 47200 | 2.3E+10 |
| 22 (Comparative) | 151 | 297 | 44850 | 9.4E+09 |
| 23 (Comparative) | 152 | 278 | 42228 | 8.6E+08 |
| 24 (Comparative) | 116 | 390 | 45191 | 2.2E+10 |
| 25 (Comparative) | 147 | 305 | 44835 | 2.2E+11 |

TABLE 6

| Sample No. | μi | DC superposition characteristic (A/m) | DC superposition coefficient | Specific resistance (Ω·cm) |
|---|---|---|---|---|
| 26 | 146 | 319 | 46542 | 2.1E+11 |
| 27 | 142 | 328 | 46520 | 1.8E+11 |
| 28 (Comparative) | 58 | 603 | 34955 | 2.2E+07 |
| 29 | 115 | 402 | 46201 | 4.2E+09 |
| 30 | 112 | 447 | 50247 | 1.9E+11 |
| 31 | 137 | 345 | 47190 | 2.2E+11 |
| 32 | 50 | 854 | 42470 | 1.4E+08 |
| 33 | 86 | 534 | 46075 | 1.2E+11 |
| 34 (Comparative) | 129 | 276 | 35731 | 2.1E+11 |
| 35 (Comparative) | 21 | 1682 | 35473 | 9.0E+07 |
| 36 (Comparative) | 40 | 1023 | 40797 | 1.2E+08 |
| 37 | 62 | 764 | 47620 | 1.8E+11 |

(Production of Sample)

Raw material powders of the major components were measured out such that the composition ratios of the major components Fe$_2$O$_3$, NiO, CuO, and ZnO were 48.0 mol %, 20.8 mol %, 11.8 mol %, and 19.5 mol %, respectively. The raw material powders were wet-blended for about 5 hours using a ball mill or the like to obtain a mixed magnetic material powder. The mixed powder was calcined in the air at 740° C. to 840° C. for 2 hours to obtain a calcined body. The resulting calcined body was crushed to a predetermined size by using a ball mill or the like to obtain a ceramic powder.

Raw material powders of the minor components were added to the ceramic powder at composition ratios shown in Tables 1 to 3, and the mixture was pulverized for about 20 hours by using a pot mill to obtain a pulverized powder. A 10% polyvinyl alcohol solution was added to the pulverized powder and mixed in a mortar to obtain a granulated powder. The resulting granulated powder was formed into a toroidal shape to obtain a compact. The compact was burned to prepare a toroidal core having an outer diameter of 19.5 mm, an inner diameter of 12.2 mm, and a height of 3 mm. Then, a cord (a coil) was wound 17 turns around the toroidal core to produce a sample.

(Measurement of DC Superposition Characteristic)

A direct current was applied to the sample, the change of the magnetic permeability was measured, and the relation between the magnetic permeability and the direct current was shown in a graph. The DC superposition characteristic (i.e. the magnetic field strength obtained when the magnetic permeability was reduced by 10% from the initial magnetic permeability μi at a direct current of 0 mA) was calculated using the graph.

(Determination of DC Superposition Coefficient)

The DC superposition coefficient was obtained by multiplying the calculated DC superposition characteristic by the initial magnetic permeability.

(Measurement of Specific Resistance)

An opposite electrode was formed on the cylindrical sample, the insulation resistance under 100 V application was measured using an insulation resistance tester, and the specific resistance was calculated from the size.

(Evaluation)

The composition ratios of the major and minor components of each sample are shown in Tables 1 to 3, and the measurement results thereof are shown in Tables 4 to 6. The samples not marked with (Comparative) are of Examples according to the present invention. In Examples, 0.06 to 0.5 parts by weight of bismuth oxide in terms of Bi$_2$O$_3$, 0.11 to 0.9 parts by weight of titanium oxide in terms of TiO$_2$, and 0.06 to 0.46 parts by weight of barium oxide in terms of BaO are added as the minor components, and the weight ratios of the bismuth, titanium, and barium oxides are such that the Bi$_2$O$_3$ proportion is 1.00, the TiO$_2$ proportion is 1.08 to 2.72, and the BaO proportion is 0.72 to 1.20. In contrast, in the samples marked with (Comparative), the weight ratios are not within the range of Examples.

For example, the sample 1 does not include any of Bi$_2$O$_3$, TiO$_2$, and BaO, the samples 2 and 3 do not include TiO$_2$ and BaO, the sample 4 does not include TiO$_2$, the samples 5 and 6 do not include BaO (in accordance with Japanese Laid-Open Patent Publication No. 2006-151742), and the samples 7, 32, and 35 do not include Bi$_2$O$_3$.

Though the samples 8 to 10, 15 to 19, 22 to 25, 28, 34, and 36 include all of Bi$_2$O$_3$, TiO$_2$, and BaO, the weight ratio of at least one of Bi$_2$O$_3$, TiO$_2$, and BaO does not fall within the above range. Thus, the TiO$_2$ and BaO weight ratios of the samples 8, 9, 16, 17, and 36, the BaO weight ratios of the samples 10, 15, 24, 25, 28, and 34, and the TiO$_2$ weight ratios of the samples 18, 19, 22, and 23 are not within the above range.

In Comparative Examples, the sample 5 had a largest DC superposition coefficient of 45981 and a specific resistance of 4.0×10$^9$ (Ω·cm). In contrast, in Examples, the sample 14 had a smallest DC superposition coefficient of 46034, which was larger than the largest value (45981) of Comparative Examples. In addition, all samples of Examples had a high specific resistance of $1 \times 10^9$ (Ω·cm) or more.

Thus, in all Examples, the DC superposition coefficients of 46000 or more and the specific resistances (Ω·cm) of $1 \times 10^9$ order or more were achieved.

Second Example

Next, in samples 38 to 59, the composition ratios of the major components were variously changed at fixed composition ratios of the minor components, and the initial magnetic permeability, the DC superposition characteristic, the DC superposition coefficient, and the specific resistance (Ω·cm) of each sample were measured. The composition ratios of the major components, the composition ratios of the minor components, and the measurement results are shown in Tables 7 to 10. The composition ratios of the major and minor components of the samples 38 to 59 are shown in Tables 7 and 8, and the initial magnetic permeabilities, the DC superposition characteristics, the DC superposition coefficients, and the specific resistances of the samples 38 to 59 are shown in Tables 9 and 10.

TABLE 7

| Sample No. | Major components (mol %) | | | | Minor components (parts by weight) | | |
|---|---|---|---|---|---|---|---|
| | $Fe_2O_3$ | NiO | CuO | ZnO | $Bi_2O_3$ | $TiO_2$ | BaO |
| 38 (Comparative) | 45.0 | 23.8 | 11.8 | 19.5 | 0.25 | 0.45 | 0.23 |
| 39 | 46.0 | 22.8 | 11.8 | 19.5 | 0.25 | 0.45 | 0.23 |
| 40 | 47.0 | 21.8 | 11.8 | 19.5 | 0.25 | 0.45 | 0.23 |
| 41 | 48.0 | 20.8 | 11.8 | 19.5 | 0.25 | 0.45 | 0.23 |
| 42 | 49.0 | 19.8 | 11.8 | 19.5 | 0.25 | 0.45 | 0.23 |
| 43 | 49.5 | 19.3 | 11.8 | 19.5 | 0.25 | 0.45 | 0.23 |
| 44 (Comparative) | 50.0 | 18.8 | 11.8 | 19.5 | 0.25 | 0.45 | 0.23 |
| 45 (Comparative) | 48.0 | 28.5 | 4.0 | 19.5 | 0.25 | 0.45 | 0.23 |
| 46 | 48.0 | 27.5 | 5.0 | 19.5 | 0.25 | 0.45 | 0.23 |
| 47 | 48.0 | 23.5 | 9.0 | 19.5 | 0.25 | 0.45 | 0.23 |
| 48 | 48.0 | 22.5 | 10.0 | 19.5 | 0.25 | 0.45 | 0.23 |

TABLE 8

| Sample No. | Major components (mol %) | | | | Minor components (parts by weight) | | |
|---|---|---|---|---|---|---|---|
| | $Fe_2O_3$ | NiO | CuO | ZnO | $Bi_2O_3$ | $TiO_2$ | BaO |
| 49 | 48.0 | 17.5 | 15.0 | 19.5 | 0.25 | 0.45 | 0.23 |
| 50 (Comparative) | 48.0 | 16.5 | 16.0 | 19.5 | 0.25 | 0.45 | 0.23 |
| 51 (Comparative) | 48.0 | 38.2 | 11.8 | 2.0 | 0.25 | 0.45 | 0.23 |
| 52 | 48.0 | 37.2 | 11.8 | 3.0 | 0.25 | 0.45 | 0.23 |
| 53 | 48.0 | 30.2 | 11.8 | 10.0 | 0.25 | 0.45 | 0.23 |
| 54 | 48.0 | 23.2 | 11.8 | 17.0 | 0.25 | 0.45 | 0.23 |
| 55 | 48.0 | 18.2 | 11.8 | 22.0 | 0.25 | 0.45 | 0.23 |
| 56 | 48.0 | 16.2 | 11.8 | 24.0 | 0.25 | 0.45 | 0.23 |
| 57 | 48.0 | 12.8 | 11.8 | 27.5 | 0.25 | 0.45 | 0.23 |
| 58 | 48.0 | 10.2 | 11.8 | 30.0 | 0.25 | 0.45 | 0.23 |
| 59 (Comparative) | 48.0 | 9.2 | 11.8 | 31.0 | 0.25 | 0.45 | 0.23 |

TABLE 9

| Sample No. | μi | DC superposition characteristic (A/m) | DC superposition coefficient | Specific resistance (Ω·cm) |
|---|---|---|---|---|
| 38 (Comparative) | 129 | 478 | 20507 | 2.3E+06 |
| 39 | 128 | 262 | 33560 | 3.2E+07 |
| 40 | 135 | 330 | 44580 | 4.4E+07 |
| 41 | 145 | 987 | 47623 | 4.1E+07 |
| 42 | 151 | 854 | 42972 | 4.0E+07 |
| 43 | 102 | 402 | 40982 | 3.4E+07 |
| 44 (Comparative) | 42 | 3114 | 43510 | 4.3E+06 |
| 45 (Comparative) | 10 | 3910 | 38447 | 3.3E+06 |
| 46 | 31 | 1432 | 44487 | 3.1E+07 |
| 47 | 48 | 857 | 41513 | 3.4E+07 |
| 48 | 138 | 335 | 46255 | 8.8E+07 |

TABLE 10

| Sample No. | μi | DC superposition characteristic (A/m) | DC superposition coefficient | Specific resistance (Ω·cm) |
|---|---|---|---|---|
| 49 | 128 | 310 | 39621 | 1.2E+08 |
| 50 (Comparative) | 134 | 296 | 39607 | 5.2E+06 |
| 51 (Comparative) | 8 | 3472 | 28242 | 1.9E+06 |
| 52 | 11 | 2906 | 32071 | 1.2E+07 |
| 53 | 35 | 1073 | 37959 | 3.1E+07 |
| 54 | 128 | 329 | 42150 | 1.9E+08 |
| 55 | 135 | 347 | 46850 | 1.1E+09 |
| 56 | 148 | 305 | 45210 | 3.0E+09 |
| 57 | 211 | 187 | 39515 | 7.8E+09 |
| 58 | 270 | 135 | 36351 | 1.8E+10 |
| 59 (Comparative) | 445 | 56 | 24893 | 5.9E+09 |

The production, DC superposition characteristic measurement, DC superposition coefficient determination, and specific resistance measurement of each sample were carried out in the same manner as First Example, and therefore the repeated explanation thereof is herein omitted.

(Evaluation)

The composition ratios of the major and minor components of each sample are shown in Tables 7 and 8, and the measurement results thereof are shown in Tables 9 and 10. The samples not marked with (Comparative) are of Examples according to the present invention. In Examples, the major components contain 46.0 to 49.5 mol % of the iron oxide in terms of $Fe_2O_3$, 5.0 to 15.0 mol % of the copper oxide in terms of CuO, 3.0 to 30.0 mol % of the zinc oxide in terms of ZnO, and the remaining mol % of the nickel oxide in terms of NiO. In contrast, in the samples marked with (Comparative), the composition ratio does not fall within the range of Examples. For example, the $Fe_2O_3$ ratios of the samples 38 and 44, the CuO ratios of the samples 45 and 50, and the ZnO ratios of the samples 51 and 59 are not within the above ranges.

The major components can be used to achieve practicable magnetic properties, i.e. a DC superposition coefficient of 30000 or more and a specific resistance of $1 \times 10^7$ (Ω·cm) or more. However, the sample 38 (Comparative) had a DC superposition coefficient of less than 30000 and a specific resistance of less than $1 \times 10^7$ (Ω·cm) due to the $Fe_2O_3$ content of less than 46.0 mol %. The sample 44 (Comparative) had a significantly low initial magnetic permeability and a low specific resistance due to the $Fe_2O_3$ content of more than 49.5 mol %. Similarly, the sample 45 (Comparative) had a significantly low initial magnetic permeability and a low specific resistance due to the CuO content of less than 5.0 mol %. The sample 50 had a low specific resistance due to the CuO content of more than 15.0 mol %. Similarly, the sample 51 (Comparative) had a significantly low initial magnetic permeability, a small DC superposition coefficient, and a low specific resistance due to the ZnO content of less than 3.0 mol %. The sample 59 had a significantly poor DC superposition characteristic due to the ZnO content of more than 30.0 mol %.

In contrast, all the samples 39 to 43 (Examples), 46 to 49 (Examples), and 52 to 58 (Examples) achieved a DC superposition coefficient of 30000 or more and a specific resistance of $1\times10^7$ ($\Omega\cdot$cm) or more. Particularly, the samples 40 to 42 achieved a specific resistance of $4.0\times10^7$ ($\Omega\cdot$cm) or more, the samples 48 and 49 achieved a specific resistance of $8.8\times10^7$ ($\Omega\cdot$cm) or more, and the samples 54 to 58 achieved a specific resistance of $1.9\times10^8$ ($\Omega\cdot$cm) or more.

It is to be understood that the ferrite material and the electronic component of the present invention are not limited to the above embodiments, and various changes and modifications may be made therein without departing from the scope of the invention.

The invention claimed is:

1. A ferrite material obtained by adding 0.06 to 0.50 parts by weight of bismuth oxide in terms of $Bi_2O_3$, 0.11 to 0.90 parts by weight of titanium oxide in terms of $TiO_2$, and 0.06 to 0.46 parts by weight of barium oxide in terms of BaO as minor components to a ferrite powder containing iron oxide, copper oxide, zinc oxide, and nickel oxide as major components, wherein the major components contain 46.0 to 49.5 mol % of the iron oxide in terms of $Fe_2O_3$, 5.0 to 15.0 mol % of the copper oxide in terms of CuO, 3.0 to 30.0 mol % of the zinc oxide in terms of ZnO, and a remaining mol % of the nickel oxide in terms of NiO, and weight ratios of the bismuth oxide, the titanium oxide, and the barium oxide are such that using a proportion of the bismuth oxide as 1.00 in terms of $Bi_2O_3$, a proportion of the titanium oxide is 1.08 to 2.72 in terms of $TiO_2$ and a proportion of the barium oxide is 0.72 to 1.20 in terms of BaO.

2. The ferrite material according to claim 1, wherein
the major components contain 47.0 to 49.0 mol % of the iron oxide in terms of $Fe_2O_3$, 10.0 to 15.0 mol % of the copper oxide in terms of CuO, 17.0 to 30.0 mol % of the zinc oxide in terms of ZnO, and the remaining mol % of the nickel oxide in terms of NiO.

3. An electronic component comprising a sintered ferrite body, wherein the sintered ferrite body is obtained by adding 0.06 to 0.50 parts by weight of bismuth oxide in terms of $Bi_2O_3$, 0.11 to 0.90 parts by weight of titanium oxide in terms of $TiO_2$, and 0.06 to 0.46 parts by weight of barium oxide in terms of BaO as minor components to a ferrite powder containing iron oxide, copper oxide, zinc oxide, and nickel oxide as major components, and by mixing and sintering the components, the major components contain 46.0 to 49.5 mol % of the iron oxide in terms of $Fe_2O_3$, 5.0 to 15.0 mol % of the copper oxide in terms of CuO, 3.0 to 30.0 mol % of the zinc oxide in terms of ZnO, and a remaining mol % of the nickel oxide in terms of NiO, and weight ratios of the bismuth oxide, the titanium oxide, and the barium oxide are such that using a proportion of the bismuth oxide as 1.00 in terms of $Bi_2O_3$, a proportion of the titanium oxide is 1.08 to 2.72 in terms of $TiO_2$ and a proportion of the barium oxide is 0.72 to 1.20 in terms of BaO.

* * * * *